Patented Mar. 5, 1935

1,993,596

UNITED STATES PATENT OFFICE 1,993,596

MANUFACTURE OF RUBBER GOODS FROM LATEX

James B. Crockett, Malden, Mass., assignor to Heveatex Corporation, Melrose, Mass., a corporation of Massachusetts No Drawing. Application August 24, 1933, Serial No. 686,569

5 Claims. (Cl. 18—58)

This invention relates to the manufacture of rubber articles from rubber latex, being more particularly concerned with hollow rubber articles or so-called dipped rubber goods such as are produced by dipping forms or molds into a bath of the latex and causing a deposition of rubber to take place from the latex onto the forms or molds.

Heretofore the practice has been to induce a deposition of the rubber from the latex onto the molds either by making them of suitable porous material, such as unglazed porcelain, or by treating them preparatory to dipping into the latex with suitable acid coagulants, such as acetic acid. Such practice, however, has given rise to some practical difficulties. Thus, on the one hand, molds made from porous material tend to lose their effectiveness in continued service as their pores become fouled with the non-rubber solids carried thereinto along with the water content of the latex. On the other hand, the use of acetic acid or other sufficiently potent acid coagulating agent in treating the molds gives rise to corrosion troubles, the nuisance of handling acid and disposing of acid fumes, and the need for neutralizing and/or washing the acid content of the rubber goods. In fact, if the molds carry excessive coagulant as they enter into the latex, this excess may drain into the latex and thus generate rubber agglomerates or small lumps of rubber which may detract from the smoothness and uniformity of the rubber deposits on the molds.

In accordance with the present invention, a rubber article is formed from rubber latex by first applying to a form having a shape or contour corresponding to that to be assumed by the article, a coating of desiccating material incapable of effecting a substantial coagulation of the latex. The form is then brought into contact with an excess of preferably concentrated latex, as by dipping into a latex bath, so as to cause the water content of the latex adjacent to the coating to be desiccated thereby and simultaneously to cause the rubber of the desiccated latex to be deposited as a layer on the coating. Thus, latices which have been concentrated to a solids content of about 45% to 60% or higher and have been suitably compounded in the usual way are most useful in such practice. Such practice is applicable to molds made of various materials and possessed of a substantially impermeable structure. The coating of desiccating material additionally serves as an insulator which prevents the rubber layer from sticking to the molds, thereby enabling the stripping of the rubber articles from the molds in an intact condition and the maintenance of the molds in an ever-serviceable condition.

There are various inert bodies of a hydrophilic nature which may be used for dressing or coating the molds according to my invention. These bodies, rather than being coagulants of latex, tend to stabilize or protect it against coagulation. Yet, when a limited amount of latex is brought into contact with these bodies in dry condition, they may abstract and absorb sufficient water from the latex to causes a deposition of solid rubber from the latex much in the same way that the evaporation of water from latex leaves a solid rubber residue. This is evidently the condition realized when molds dressed or coated with desiccating materials such as I have described are dipped into latex, there being a removal of water from the limited amount of latex immediately next to the coatings sufficient to give rise to the deposition of rubber on the coatings.

The colloidal clays, such as bentonite, wilkenite, and ardmorite, may be used to good advantage as the desiccating materials in the practice of my invention, as they are characterized by their high water-absorbing capacity and their substantial inertness, from a chemical standpoint, with respect to rubber latex. These materials may be dusted onto the molds, but from the standpoint of arriving at a uniform coating of sensible thickness on the molds, it is preferable to prepare a smooth, aqueous slurry or paste of these materials, then to apply the paste onto the molds as a smooth, uniform coating, and to dry the coating.

Here is a typical formula for an aqueous coating composition falling within the purview of the present invention:—

| | Parts by weight |
|---|---|
| Water | 140 |
| Bentonite | 13 |

A substantially impermeable mold made of such material as wood, metal, glass, or the like, say, a toy-balloon form, may be dipped into the foregoing composition and the form then dried as at room temperature. The dried form will have a smooth, firm deposit of clay of substantially uniform thickness thereon. The dried form can then be dipped into a bath of suitable latex composition, removed from the bath after a period of immersion of some minutes, dried, and the rubber deposit vulcanized, if desired. It is found that the finished balloon can be easily removed from the form.

It is to be noted that the coating composition given in the foregoing example is approximately a 10% aqueous clay suspension. Generally speaking, clay suspensions of this consistency are quite satisfactory for use as the coating medium into which the molds are dipped, as they tend to leave smooth, substantially uniform deposits on the molds. The precise composition of the aqueous clay suspension is, however, subject to more or less variation, depending upon the precise qualities of the clay and more particularly its water-absorbing property.

The principles of the present invention may be applied in the fabrication of a wide variety of dipped rubber goods, including bathing caps, shoes, gloves, nipples, toy figures, etc. While the rubber goods are still on the forms, they may be imprinted with any suitable characters and/or designs; and any excess rubber at the margins may be trimmed off. The principles of the present invention may be extended to the fabrication from rubber latex of sheet rubber goods on flat or figureless forms, for instance, on plates, drums, or belts. Thus, a steel drum of large diameter may be rotated at a slow rate of speed partially submerged in a bath of rubber latex. It may progressively receive on an unsubmerged portion of its periphery a uniform coating of an aqueous composition such as described and have the coating dried thereon as by heating the drum internally or by circulating a current of heated air past the coating, before the coating dips into the latex. The rubber deposit effected on the coating while it is submerged in the latex may be progressively dried and stripped from the drum periphery after it has issued from the latex bath, whereupon the drum periphery may, if desired, be washed and/or dried, and again coated before it undergoes the next submersion in the latex. In a similar way, a substantially non-porous belt traveling continuously and horizontally over guide rolls with its lower stretch passing through a bath of latex may be uniformly spread on a portion of its upper stretch with the aqueous composition and the coating dried before it makes contact with the latex, whereupon the rubber deposit delivered by the upper stretch of the belt may be dried and stripped from the belt preparatory to coating it anew with the aqueous composition.

It is again to be observed that my invention makes possible the use of molds of substantially non-porous nature so as to yield results comparable to those realized when using unglazed porcelain or similar molds without, however, encountering the disadvantages inhering in such molds. If desired, they may be washed and/or dried each time after articles have been fabricated thereon so as to furnish a clean surface for a succeeding use. It will, of course, be understood that the term "mold" or "form" is used herein and in the appended claims in its broad sense to mean not only figured molds for such articles as toy-balloons, bathing caps, gloves, nipples, etc., but also figureless molds for flat or sheet rubber.

The rubber latex used in the dipping bath may be prepared or compounded in such a way as to comport with the characteristics desired in the finished articles. Thus, the rubber latex used is preferably one concentrated to a supernormal solids content by any approved modern treatment. It may be a vulcanized latex or one containing vulcanizing and/or other compounding ingredients, e. g., sulphur, accelerators of vulcanization, fillers, pigments, or other colorants. Indeed, I am using the term "latex" in its comprehensive sense to mean not only the natural rubber-bearing serum, but also artificial aqueous dispersions of rubber partaking of the qualities of natural latex.

It is possible to depart in some respects from the examples hereinbefore given. Thus, in some cases, the molds may be heated internally as by hot water or other heating fluid or by electrical or other means to promote the deposition of the rubber from the latex even though the deposition may come about largely through the desiccating action of the coating on the molds. As already stressed, molds dressed or coated as hereinbefore described, permit an easy stripping of the finished rubber goods therefrom.

The drying of the aqueous composition may be effected at elevated temperature, for instance, by heating the interior of the molds by circulating heated air past the coated molds, or in any other suitable way. The drying of the rubber deposited on the molds may be similarly effected.

I claim:—

1. A method of forming a rubber article from rubber latex, which comprises applying to a form of the desired shape a coating of colloidal desiccating material incapable of effecting a substantial coagulation of the latex but having a high water-absorbing capacity, bringing said form so coated with substantially non-coagulating, desiccating material into contact with an excess of latex to cause the water content of the latex adjacent to said coating to be desiccated thereby and simultaneously to cause the rubber of said desiccated latex to be deposited as a layer on said coating, drying the rubber deposit, and stripping it from the form.

2. A method of forming a rubber article from rubber latex, which comprises applying to a form of the desired shape a coating of colloidal pulverulent desiccating material incapable of effecting a substantial coagulation of the latex but having a high water-absorbing capacity, bringing said form so coated with substantially non-coagulating, desiccating material into contact with an excess of latex to cause the water content of the latex adjacent to said coating to be desiccated thereby and simultaneously to cause the rubber of said desiccated latex to be deposited as a layer on said coating, drying the rubber deposit, and stripping it from the form.

3. A method of forming a rubber article from rubber latex, which comprises applying to a form of the desired shape a coating of colloidal clay of the nature of bentonite, wilkenite, and ardmorite substantially inert chemically with respect to the latex, bringing said form so coated with substantially inert clay into contact with an excess of latex to cause the water content of the latex adjacent to said coating to be desiccated thereby and simultaneously to cause the rubber of said desiccated latex to be deposited as a layer on said coating, drying the rubber deposit, and stripping it from the form.

4. A method of forming a rubber article from rubber latex, which comprises applying to a form of the desired shape a coating of aqueous composition substantially inert chemically with respect to the latex and containing colloidal clay of the nature of bentonite, wilkenite, and ardmorite as the main solid ingredient, drying the form so coated with substantially inert composition, bringing the dried, coated form into contact with an excess of latex to cause the water content of the latex adjacent to said coating to be desiccated thereby and simultaneously to cause the rubber of said desiccated latex to be deposited as a layer on said coating, drying the rubber deposit, and stripping it from the form.

5. A method of forming a rubber article from rubber latex, which comprises dipping a form of the desired shape into a smooth, aqueous slurry containing colloidal clay of the nature of bentonite, wilkenite, and ardmorite, thereby depositing a smooth, uniform coating on such form, drying the coating on such form, bringing the dried, coated form into contact with an excess of latex to cause the water content of the latex adjacent to said coating to be desiccated thereby and simultaneously to cause the rubber of said desiccated latex to be deposited as a layer on said coating, drying the rubber deposit, and stripping it from the form.

JAMES B. CROCKETT.